United States Patent Office 3,234,067
Patented Feb. 8, 1966

3,234,067
PROCESS FOR BONDING RUBBER TO POLYESTER
SHAPED STRUCTURES
Henry R. Krysiak, Wilmington, Del., assignor to E. I. du
Pont de Nemours and Company, Wilmington, Del., a
corporation of Delaware
No Drawing. Filed Nov. 5, 1962, Ser. No. 236,153
9 Claims. (Cl. 156—330)

This invention relates to the treatment of shaped structures, and more particularly to a method for treating shaped structures such as films and fibrous textile material, to improve their adhesion to rubber. Specifically, the invention provides a new and useful procedure for treating shaped structures of synthetic linear condensation polyesters to improve their ability to adhere to rubber under severe flexing conditions.

In contrast to the naturally occurring polymer fibers such as cotton and the older synthetic fibers such as nylon, the newer polyester fibers have been found particularly difficult to bond to rubber. The outstanding properties of polyethylene terephthalate fibers and their commercial availability, have made it highly desirable that a good polyester-to-rubber adhesive be developed.

It is an object of this invention to provide an adhesive system which gives a superior bond between elastomer compositions and organic polymeric shaped structures. A further objective is to provide an adhesive system providing superior adhesion between elastomer compositions and synthetic linear condensation polyester fibers. Another objective is to provide such a system which is applicable with a variety of fibers and elastomer compositions. Other objectives will appear hereinafter.

These and other objects are achieved by the process of the invention which comprises treating the fibrous textile material with an aqueous medium containing from about 10% by weight to about 40% by weight of dispersed solids of:

(A) A water-insoluble polyepoxide preferably having on the average at least 2 epoxy groups in each molecule, a melting point above about 90° C., an average molecular weight above about 800 and an epoxide equivalent above about 200;

(B) An aromatic urethane having the formula

Ar(NHCOX)$_n$ wherein Ar is an organic residue containing at least one aromatic nucleus, X is a radical selected from the class consisting of aryloxy, arylthio, iminoxy, and lactam-N-yl, and $n$ is a whole number of at least 2, the weight ratio of $(A)/(B)$ being within the range from about 0.1 to about 10;

(C) A resorcinol-formaldehyde resin in which the mol ratio of resorcinol to formaldehyde is between about 1.1 and 8; and (D) A rubber, preferably a synthetic vinylpyridine copolymer latex, the weight ratio of $(D)/(C)$ being within the range from 1 to 6, and with the sum of (C) plus (D) constituting from about 50% to about 90% by weight of the total solids dispersed in the aqueous medium.

The resorcinol-formaldehyde resin (C) should be prepared in the absence of added caustic and the final adhesive mixture should not contain excess caustic. This composition, when applied and processed as described below, provides a final shaped structure bearing a coating of the reaction product of A, B, C, and D, constituting from about 0.2 to about 15% by weight of the coated structure. The composition of the present invention is applied to the polymeric shaped structure by any conventional means such as dipping, spraying, brushing, padding, or the like with the structure relaxed or under tension. After coating with the aqueous mixture described above, the wetted shaped structure is heated at a temperature above about 135° C. but below the melting point of the polymer making up the shaped structure, for a period of from about 0.3 to about 15 minutes to remove the water and to cure the coating. Particularly where the shaped structure is fibrous in nature, it is preferred that the structure be subjected to at least sufficient tension to prevent excessive shrinkage during the wetting and subsequent curing operations.

The organic polymeric shaped structure (preferably a fiber or film) is coated with a composition of the present invention, i.e., a water dispersion of a polyepoxide, a urethane, a resorcinol-formaldehyde resin, and a latex, which coating is thereafter at least partially cured by heating at a temperature above about 150° C. Thereafter the rubber is applied and cured. The product is a reinforced rubber-shaped structure.

In the examples illustrating the manner in which the invention may be carried out and the advantages obtained, the strength of the adhesive is determined by the "single-end strip adhesion test" (SESA), or the "H-pull" test.

In preparing samples for the single-end strip adhesion test, lengths of treated cord are placed in the bottom of a steel mold, the cords being parallel with a spacing of 1" between cords. The cords are placed under dead-weight tension to maintain their position. A sheet of unvulcanized compounded elastomer stock, 125 mils in thickness, is placed over the cords, covered with a cotton duck reinforcing backing, and the top plate of the mold placed over the backing. The mold is put into a platen press. A pressure of approximately 150 p.s.i. is applied and the mold is usually heated to about 150° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1" wide strips, each having a cord in the center of its width. The cord end is separated from one end of the strip; the free end of the elastomer strip so obtained is clamped in the upper jaw of an Instron testing machine and the free end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet.

The "H-pull" test is the well-known test described, for example, in India Rubber World, 114, 213–219 (May 1946), "Study of the 'H' Test for Evaluating the Adhesive Properties of Tire Cord in Natural and GR-S Rubber." Briefly, a dipped cord is cured across the center of two small rectangles of rubber with a short length of the cord exposed between the rubber pieces forming the cross-bar of the "H." The pieces of rubber are gripped in an Instron Tensile Testing machine and stress is applied so that the cord is pulled out from one of the pieces of rubber. The load required is regarded as a measure of the adhesion. In the examples of the present specification, the width of the rubber pieces are reduced to ¼ inch since greater width samples resulted in cord breaks rather than adhesive failure due to the high level of adhesion experienced with this new adhesive system.

Example I (a) To 176 parts of water is added 88 parts (0.8 mol) of resorcinol and 47.6 parts of 37% formaldehyde (0.58 mol). The mixture is thoroughly stirred and then added to 572 parts of a 41% solids butadiene/styrene/vinylpyridine (70/15/15) copolymer latex. The resulting RFL mixture is aged for 2 months before using.

Two hundred parts of an epoxylated novolac resin having a softening point of 99° C., an average molecular weight of 1,270, and an epoxide equivalent of 235, is finely powdered and dispersed in 910 parts of water to give an 18% suspension. Five parts of an alkyl sodium sulfonate is added as a wetting agent. This mixture is ball-milled for about 20 hours before using.

Two hundred parts of the bis phenol adduct of diphenylmethane-4,4'-diisocyanate is dispersed in 800 parts of water using 8 parts of the dioctyl ester of sodiumsulfosuccinic acid as a wetting agent. The 20% solids mixture is ball-milled for about 20 hours before using.

An adhesive mixture (Dip A) is prepared from the above-described components by mixing 60 parts of the resorcinol/formaldehyde-latex mixture, 25 parts of the isocyanate adduct suspension, and 25 parts of the epoxylated novolac suspension. A polyethylene terephthalate tire cord of 1100 denier/2-ply construction is passed through this adhesive mixture at room temperature and then passed through an oven, where the wetted cord is dried at 218° C. for 1 minute while undergoing 1% applied stretch. The adhesive-coated cord is then tested for adhesion to rubber in the H-pull and single end strip adhesion test, using a rubber stock of the following composition:

| | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

The results of the test are recorded in Table I.

(b) The test is repeated using a resorcinol-formaldehyde-latex mixture which has been allowed to age only 4 days (Dip B). The adhesion test results are recorded in Table I.

(c) The general procedure outlined in (a) above is again repeated, with the exception that the weight ratio of latex solids to resorcinol-formaldehyde resin is changed to 3.3, giving an adhesive mixture (Dip C) containing 16.3% latex solids and 4.9% resin. Other conditions are the same as described above. The adhesive-coated cords are tested for adhesion in the single end strip adhesion test with the results shown in Table I.

TABLE I

| Dip | Dipped Cord Properties | | H-Pulls, lbs. | | Single End Strip Adhesion, lbs. | |
|---|---|---|---|---|---|---|
| | Break Strength, Kg. | Elongation, Percent | 24° C. | 140° C. | 24° C. | 140° C. |
| A | 13.3 | 15.3 | 29 | 18 | 6.2 | 4.8 |
| B | 13.2 | 13.1 | 31 | 21 | 6.5 | 5.6 |
| C | 13.3 | 14.2 | | | 8.0 | 4.3 |

Example II

To illustrate the necessity for using a high molecular weight, water-insoluble polyepoxide in the present invention, the general procedure of Example I was carried out using as the epoxy compound a commercially available liquid water-soluble polymeric glycidyl ether of glycerol having an epoxide equivalent of about 170, and an average molecular weight of about 325. The adhesive-coated cord produced exhibited poor adhesion, giving single end strip adhesion values (24° C.) less than about 1 lb., and cold H-pull values less than about 9 lbs., in contrast to the higher values of Example I.

In a second control experiment, a similar adhesive mixture prepared from the above-described water-soluble epoxy compound coagulated within about 10 minutes, and could not be used.

Example III

To illustrate the effect of added caustic on the adhesive mixture of this invention, the general procedure of Example I was repeated with the exception that to 110 parts of the final adhesive mixture was added 10 parts of 1 normal sodium hydroxide solution. Polyethylene terephthalate tire cord, coated with this mixture and cured as described in Example I, gave single end strip adhesion values of 3.1 lbs. at 140° C. and 4.8 lbs. at 24° C.

Example IV

Following the general procedure of Example I, an adhesive mixture is prepared using as the epoxy compound a commercially available epoxylated novolac resin, "Kopox" 955A (trademark of the Koppers Co.). This epoxy compound is insoluble in water, has a softening point of 95° C., an average molecular weight of 855, and an epoxide equivalent of 310. Two adhesive dips are prepared having the following composition:

Dip A:
  21% RFL (dry solids)
  4.1% epoxy compound
  4.7% isocyanate adduct

Dip B:
  19% RFL
  3.7% epoxy compound
  6.1% isocyanate adduct

Samples of polyethylene terephthalate tire cord of 1100/2 construction are dipped in each mixture and cured at 218° C. for 1 minute under 1% applied stretch, and tested for adhesion with the results shown in Table II.

TABLE II

| Dip | H-Pulls, lbs. | | Single End Strip Adhesion, lbs. | |
|---|---|---|---|---|
| | 24° C. | 140° C. | 24° C. | 140° C. |
| A | 30 | 19 | 6.9 | 5.5 |
| B | 27 | 19 | 5.6 | 5.0 |

The adhesive-coated cord prepared with Dip A above is used to build a 4-ply, 850×14 automobile tire by standard methods known to the art. The skim stock used is the rubber described in Example I, and the tread stock is all butadiene/styrene rubber. The tire is inflated to 22 p.s.i. and then subjected to a high speed endurance test in which the tire is run against a steel wheel, 5.6 ft. in diameter, at 75 m.p.h. with a load of 1,325 lbs. applied to the tire, which is 110% of the maximum permissible load recognized by the Tire & Rim Association. The ambient temperature during the test is 100° F. In the 3,000 mile test the tire shows no tread separation or other failure attributable to adhesion failure. This result is in contrast to the average tread separation mileage of about 600 observed for tires constructed of polyethylene terephthalate cords dipped with an adhesive mixture containing the resorcinol-formaldehyde-latex component only.

*Example V*

An adhesive mixture is prepared according to the general procedure of Example I with the exception that the epoxy compound used is a commercially available polymeric diglycidyl ether of bisphenol A, sold under the trademark Araldite 6084 (Ciba Company, Inc.). This epoxy compound has a melting point of 100° C. and an epoxide equivalent of 935. Twenty-five parts of a 20% aqueous suspension of this epoxy compound is mixed with 26 parts of a 20% aqueous suspension of the phenol adduct of diphenylmethane-4,4'-diisocyante and 60 parts of the resorcinol-formaldehyde-latex mixture prepared in Example I. A polyethylene terephthalate tire cord of 1100/2 construction is passed through this mixture and then cured at 218° C. for 0.8 minute while being subjected to a 1% applied stretch. When tested for adhesion, this coated cord is found to give strip adhesion values of 6.7 lbs. at 24° C. and 4.6 lbs. at 140° C.

The above experiment is repeated in general outline with a number of adhesive mixtures having different ratios of isocyanate adduct to epoxy compound. Each mixture is applied to a polyethylene terephthalate tire cord, cured, and tested for adhesion with the results shown in the following table:

TABLE III

| Run | Dip Composition, percent | | | SESA, lbs. | |
|---|---|---|---|---|---|
| | Isocyanate Adduct | Epoxy | RFL Solids | 24° C. | 140° C. |
| 1 | 2.8 | 6.3 | 24 | 6.2 | 3.2 |
| 2 | 3.8 | 5.7 | 22 | 5.2 | 3.8 |
| 3 | 5 | 4.7 | 22 | 6.6 | 4.8 |
| 4 | 8.7 | 1.9 | 22 | 5.9 | 5.1 |

*Example VI*

In order to further illustrate the critical nature of the claimed composition, a series of related adhesive mixtures were prepared and tested with selected major components being omitted from each mixture.

Adhesive mixture VI-A consisted of an aqueous suspension containing 4.2% of the polyepoxide described in Example I and 30% (dry solids basis) of the resorcinol-formaldehyde-latex mixture described in Example I. No isocyanate adduct was present.

Adhesive mixture VI-B consisted solely of the resorcinol-formaldehyde-latex mixture described in Example I, the total solids content of the suspension being 37%. Neither an epoxy compound nor an isocyanate adduct was added to this mixture.

Adhesive mixture VI-C consisted of an aqueous suspension containing 4% by weight of the phenol adduct of diphenylmethane-4,4'-diphenyldiisocyanate and 24% by weight (dry solids) of the resorcinol-formaldehyde-latex mixture described in Example I. No epoxy compound was added to this mixture.

Each of the above mixtures was tested for adhesion by dipping a polyethylene terephthalate tire cord of 1100/2 construction in the mixture and then drying the cord at 218° C. for 1 minute at 1% applied stretch.

Single end strip adhesion tests were carried out as described previously with the results shown in Table IV. It is noted that neither of these mixtures gives test values comparable to those given by an adhesive of this invention, e.g., Example I.

TABLE IV

| Adhesive mixture | Single End Strip Adhesion lbs. | |
|---|---|---|
| | 24° C. | 140° C. |
| VI-A | 2.2 | .97 |
| VI-B | 1.5 | 0.70 |
| VI-C | 2.6 | 1.7 |

*Example VII*

A 25% aqueous suspension of the bis-caprolactam adduct of toluene-2,4-diisocyanate is prepared by vigorous mixing of 267 parts of the isocyanate adduct with 800 parts water containing 4 parts dioctylsodiumsulfosuccinate as a dispersing agent. Thirty-five parts of this isocyanate adduct suspension is then mixed with 25 parts of an 18% suspension of the epoxy compound of Example I, and 60 parts of the resorcinol-formaldehyde-latex mixture of Example I. This adhesive mixture is then applied to a polyethylene terephthalate tire cord and the coated cord is dried at 218° C. for 0.8 minute while undergoing 1% applied stretch. The adhesive-coated cord is then tested for adhesion to the rubber described in Example I using the single end strip adhesion test. A test value of 4.5 lbs. is obtained at 140° C. and 4.7 lbs. at 24° C.

*Example VIII*

To illustrate the effect of dip concentration and cord pickup on adhesion, a dip was prepared by mixing 150 parts of the resorcinol-formaldehyde-latex mixture of Example I, 65.5 parts of a 20% aqueous suspension of the phenol adduct of diphenylmethane-4,4'-diisocyanate, and 62.5 parts of an 18% aqueous dispersion of the polyepoxide described in Example I. Aliquot portions of this mixture, which has a total solids content of 29.7%, are diluted with water to give two additional adhesive mixtures having concentrations of 25% and 20%. A sample of 1100/2 polyethylene terephthalate tire cord is dipped in each mixture and dried at 216° C. for 0.7 minute under 1% applied stretch. Dip pickup is calculated from the weight gained by the dry cord. Each sample is tested for adhesion to rubber with the test results shown in Table V.

TABLE V

| Dip | Total Solids in Dip, percent | Dip Pickup, percent (Dry) | H-Pulls, lbs. | | Strip Adhesion, lbs. | |
|---|---|---|---|---|---|---|
| | | | 24° C. | 140° C. | 24° C. | 140° C. |
| A | 29.7 | 10 | 29 | 19 | 5.7 | 4.7 |
| B | 25 | 7.2 | 27 | 20 | 5.0 | 3.6 |
| C | 20 | 5.6 | 26 | 16 | 3.6 | 3.0 |

*Example IX*

Modifications of the adhesive mixture of this invention are prepared having the following compositions:

IXa:
    20 parts RFL mixture of Example I (dry solids basis)
    6.7 parts bis-phenol adduct of toluene-2,4-diisocyanate
    4.3 parts epoxy compound of Example V
    69 parts water IXb:
    19 parts RFL mixture of Example I (dry solids basis)

4.88 parts bis-caprolactam adduct of toluene-2,4-diisocyanate
1.22 parts bis-caprolactam adduct of toluene-2,6-diisocyanate
3.8 parts epoxylated novolac resin of Example I
71 parts water IXc:
19 parts RFL mixture of Example I (dry solids basis)
6.1 parts bis-caprolactam adduct of diphenylmethane-4,4'-diisocyanate
3.8 parts epoxylated novolac resin of Example I
71 parts water IXd:
19 parts RFL mixture of Example I (dry solids basis)
6.1 parts bis-phenol adduct of metaphenylene diisocyanate
3.8 parts epoxylated novolac resin of Example I
71 parts water IXe:
22 parts RFL mixture of Example I (dry solids basis)
5 parts bis-phenol adduct of diphenylmethane-4,4'-diisocyanate
4.7 parts commercial epoxy resin based on bisphenol A and epichlorohydrin having a melting point of 95–105° C., an epoxide equivalent of 870–1025 and an average molecular weight of 1400 ("Epon" 1004, Shell Chemical Co.)
68 parts water Each of the above mixtures is applied to a polyethylene terephthalate tire cord of 1100/2 construction and cured at 218° C. for 0.8 minute, while applying a 2% stretch to the cord. The treated cord is treated for adhesion in the single end strip adhesion test, using two different rubber stocks. The results are recorded in Table 6 where rubber stock A is the rubber described in Example I and rubber stock B is a blended natural rubber/styrene-butadiene rubber/reclaimed rubber tire skim stock of approximately 60/20/20 composition by weight. In this series of strip adhesion tests the samples prepared from rubber stock A are cured at 150° C. for 1 hour, while those prepared from rubber stock B are cured at 150° C. for 25 minutes.

TABLE VI

| Adhesive Mixture | Single End Strip Adhesion, lbs. | | | |
| --- | --- | --- | --- | --- |
| | Rubber A | | Rubber B | |
| | 24° C. | 140° C. | 24° C. | 140° C. |
| IXa | 4.2 | 2.2 | 5.7 | 1.4 |
| IXb | 4.2 | 4.3 | 4.4 | 1.9 |
| IXc | 5.4 | 4.8 | 5.4 | 1.7 |
| IXd | 5.2 | 4.8 | 6.3 | 1.9 |
| IXe | 6.6 | 4.7 | 4.6 | 1.6 |

*Example X*

An 1100 denier polyethylene terephthalate yarn is twisted, plied and cabled to give a conventional V-belt cord of 1100/2/5 construction. This cord is dipped in an adhesive of the following composition:

15 parts RFL mixture of Example I (dry solids basis)
3.5 parts bis-phenol adduct of diphenylmethane-4,4'-diisocyanate
3.3 parts epoxy compound described in Example V
78 parts water After dipping the cord is cured for 1 minute at 218° C. using 1% applied stretch, and then tested for adhesion in the rubber stock described in Example I. Single end strip adhesion values of about 10 lbs. are obtained at 24° C. Failure occurs within the rubber rather than at the adhesive bond.

*Example XI*

A polyethylene terephthalate film having a thickness of 8 mils is coated with an adhesive mixture of the following composition:

21 parts RFL mixture of Example I (dry solids)
8.2 parts bis-phenol adduct of diphenylmethane-4,4'-diisocyanate
4.5 parts of the epoxy compound described in Example V
66 parts water The coated film is air dried and cured for 2 minutes at 218° C. A strip of rubber stock B of Example IX, 125 mils thick, is placed between two samples of adhesive-coated film and cured under pressure for 25 minutes at 150° C. Samples of the film-rubber sandwich, cut to 1" width, are tested in a tensile tester where it is found that an average force of 120 lbs. is required to strip the film from the rubber. Failure of the sample occurs completely within the rubber.

*Example XII*

An adhesive mixture is prepared having the following composition:

21 parts RFL mixture of Example 1 (dry solids)
4.7 parts bis-phenol adduct of diphenylmethane-4,4'-diisocyanate
4 parts of the epoxy compound described in Example I
70 parts water Samples of 1100/2 polyethylene terephthalate tire cord are dipped in this adhesive and then cured under various combinations of time and temperature as shown in Table VII. Strip adhesion test values in the rubber stock of Example I are shown for each sample.

TABLE VII

| Curing Temp., ° C. | Curing Time, Minutes | Single End Strip Adhesion, Lbs. | |
| --- | --- | --- | --- |
| | | 24° C. | 140° C. |
| 204 | 1 | 4.4 | 3.6 |
| 213 | 1 | 4.7 | 3.6 |
| 221 | 1 | 7.6 | 5.2 |
| 229 | 1 | 5.1 | 4.5 |
| 216 | 0.9 | 6.6 | 4.2 |
| 216 | 0.8 | 5.7 | 4.7 |
| 218 | 0.5 | 4.8 | 4.0 |
| 218 | 0.3 | 4.4 | 3.6 |

*Example XIII*

A 66 nylon tire cord of 840/2 construction is coated with an aqueous adhesive mixture of the following composition:

15 parts RFL mixture of Example I (dry solids)
3 parts bis-phenol adduct of diphenylmethane-4,4'-diisocyanate
3.3 parts epoxy compound described in Example V
79 parts water The coated cord is cured at 218° C. for 1 minute while undergoing 1% applied stretch, and then tested for adhesion in the single end strip adhesion test using the rubber stock of Example I. A strip adhesion value of 4 lbs. is obtained at 24° C.

*Example XIV*

A 42% solids butadiene/styrene/vinylpyridine latex in which the ratio of components is 70/20/20 is used to prepare an RFL mixture by mixing 143 parts of the latex with 22 parts resorcinol, 11.9 parts 37% formaldehyde, and 44 parts water. This RFL mixture is aged for 4 days and then used to prepare an adhesive mixture having the following composition:

22 parts RFL mixture (dry solids basis)

5 parts bis-phenol adduct of diphenylmethane-4,4'-diisocyanate
4.7 parts epoxy compound described in Example V
68 parts water This mixture is applied to a polyethylene terephthalate tire cord of 1100/2 construction and cured at 218° C. for 0.8 minute while stretching the cord 2%. Using the rubber stock of Example I, strip adhesion values of 5.0 lbs. and 4.1 lbs. are obtained at 24° C. and 140° C. respectively. Using rubber stock B of Example IX, a strip adhesion value of 4.5 lbs. is obtained at 24° C.

The term "polyepoxide" is used to describe uncured chemical compounds having an average of at least 2 epoxy groups, i.e., at least 2

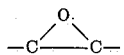

in each molecule, a melting point above 90° C., preferably between 90° C. and 150° C., an average molecular weight above 800, preferably between 800 and 3,000, and an epoxide equivalent above 200, preferably 200 to 2500. It is essential that the compound be insoluble in water and have a high melting point in order that premature reaction of the epoxy groups is minimized. Suitable epoxy compounds may be chosen from the classes typified by the diglycidyl ether of bisphenol A and its homologs, by the glycidyl ethers of glycerol, by the glycidyl ethers of bisphenol F, by the glycidyl ethers of tetrakis (hydroxyphenyl)ethane, and by the epoxylated novolacs described in British Patent No. 746,824. Such compounds are disclosed and described more fully in "Epoxy Resins," by Lee and Neville, McGraw-Hill Book Co., Inc., New York, 1957. The term "epoxide equivalent" is the weight of resin in grams which contains 1 gram equivalent of epoxy groups. The value is determined by the method described in Lee and Neville on page 21. It is preferred that the polyepoxide be present in the final adhesive mixture at a concentration in the range 1–9%.

The second essential component of the adhesive composition of the present invention is an aromatic polyisocyanate adduct, or urethane, having the formula $$Ar(NHCOX)_n$$

By a compound having the formula $Ar(NHCOX)_n$ is meant an adduct of an aromatic polyisocyanate

$$Ar(NCO)_n$$

in which the —NCO groups are connected to the aromatic nucleus and $n$ is at least 2, and an active hydrogen compound HX. HX is chosen for its ability to form an adduct which is relatively inert at room temperature, being stable in the presence of water, but which dissociates when heated to temperatures above about 150° C., yielding the free isocyanate compound in its active form. HX is preferably chosen from the groups consisting of phenols, thiophenols, oximes, and lactams.

The radical Ar, from the formula $Ar(NHCOX)_n$, may be any organic residue containing at least 1 aromatic nucleus. Specific examples of suitable polyisocyanate adducts are illustrated in U.S. Patent No. 2,994,671 to Thompson, dated August 1, 1961. Among these may be specifically mentioned diphenyl methane - 4,4' - diisocyanate, toluene-2,4-diisocyanate, benzene-1,3 - diisocyanate, diphenylether-2,4,4'-triisocyanate, triphenylmethane-4,4', 4''-triisocyanate and their various adducts as related above. It is preferred that the isocyanate adduct be present in the final adhesive mixture at a concentration in the range 1–9%.

In preparing the adhesive mixtures of this invention, the polyepoxide and the isocyanate adduct are dispersed in water along with a rubber and a phenol-aldehyde condensate. Preferably, the phenol-aldehyde condensate is a resorcinol-formaldehyde resin in which the ratio of resorcinol to formaldehyde falls in the range 1.1 to 8. Best results are obtained if the resorcinol-formaldehyde resin is prepared in the absence of added caustic or amines. The rubber component of the mixture is preferably a synthetic latex prepared in part from vinylpyridine. Excellent results have been achieved by using commercially available butadiene/styrene/vinylpyridine copolymer latices in which the three components are present in the mol ratios 70/15/15 and 70/25/5. In the final adhesive mixture it is preferred that the ratio of latex solids to phenol-aldehyde resin solids fall in the range 1–6, and that the combined weight of the phenol-aldehyde-latex solids be present in the concentration range 8–25% by weight, based on the total weight of the mixture.

In addition to the components described above, the preferred aqueous adhesive mixture of this invention may also contain, if desired, optional materials such as wetting agents, dispersing agents, and viscosity builders. For example, a non-ionic dispersing agent, such as an alkylaryl polyether alcohol, may be used to disperse the finely divided solid isocyanate adduct in water for the preparation of the adhesive mixture. The viscosity of the adhesive mixture may be adjusted by the addition of well-known thickening agents such as gum tragacanth, one of the natural poly-saccharide gums, or a methylated cellulose.

As pointed out previously, after applying the aqueous adhesive mixture containing the polyepoxide-isocyanate adduct-rubber-phenol aldehyde resin reactants to the shaped structure it is necessary that a reaction be made to occur between the reactants. This is accomplished by heating. With tire cord and like structures it is generally convenient to combine the heating operation with the customary hot stretching treatment of such cords. In any case, it is necessary to heat the coated structure to a temperature of at least 135° C., and preferably at least 150° C. to promote the reaction. Higher temperatures may be employed to hasten the reaction, up to the melting temperature of the polymeric shaped structure, but usually a temperature within the range from about 150° C. to about 235° C. is preferred in the treatment of fibrous structures. The time period necessary for the curing operation will vary widely depending upon factors such as the bulk of the base polymer structure and the temperature employed. The shorter periods are favored by higher temperatures and lightweight coated structures. When treating fibrous structures, it is generally preferable to perform this curing operation with the structure under at least sufficient tension to prevent significant shrinkage. At times it is advantageous to apply sufficient tension to stretch the structure during this operation. When the adhesive composition is applied as taught herein the shaped structure will pick up a coating of reactants constituting from about 0.2 to 20% by weight of the coated structure. Generally it is preferred to adjust concentrations and conditions of application to provide a coated structure containing reactants constituting about 3 to about 12% by weight of the coated structure.

The polymeric structures bearing the cured polyepoxide-polyisocyanate-rubber-phenol aldehyde resin coating may be bonded to rubber in the customary manner by use of heat and pressure to form reinforced articles in which both the dry and wet adhesion of the synthetic polymer to rubber is outstanding and in which both cold and hot adhesion are outstanding in comparison with other known adhesives for polyesters. The adhesion afforded by the composition of this invention is superior on polyester structures over a broad range of application and testing conditions in a wide variety of rubber stocks. An outstanding feature of the adhesive is that it can be applied by the use of a single stage dipping process, a feature which is particularly important for commercial applications. While the composition is particularly valuable for polyester structures, it is to be understood that it is also suitable for other polymeric structures, such as polyamide fibers, as well as cellulosic structures and the natural fibers.

The nature of the "rubber" in the final shaped structure is not critical and may be either a natural or a synthetic rubber. Furthermore, the technique of applying the rubber to the reinforcing structure prepared in accordance with the present invention (e.g. film, fiber or the like) is accomplished by conventional and well known techniques. It will be apparent to those skilled in the art that the rubber stock applied may contain additives such as vulcanizers, fillers, pigments, antioxidants and the like.

Compositions produced according to the present invention may be utilized for a wide variety of important industrial applications. They may be used, for example, in the preparation of pneumatic tires for automobiles, buses, tractors and aircraft, in transmission belts, conveyor belts, floor tiles, hoses, raincoats, luggage, and the like.

The process of the invention may be applied to the treatment of any fibrous material useful in the reinforcing of rubber products, such as cotton, rayon, nylon, and the like. However, especially valuable results are obtained when the invention is applied to polyester fibers and other shaped structures such as those prepared from polyethylene terephthalate, because of the inadequacy of previously known adhesive systems. Illustrative of the polyesters useful in preparing shaped structures which may be bonded to rubber by the process of this invention are those disclosed in United States Patents Nos. 2,465,319, 2,965,613 and 2,901,466.

Since many different embodiments of the invention may be made without departing from the spirit and scope thereof, it is to be understood that the invention is not limited by the specific illustrations except to the extent defined in the following claims.

I claim:

1. The process for bonding rubber to a shaped structure composed of a linear condensation polyester which comprises
   (1) coating the structure with an aqueous medium containing from about 10% to 40% by weight of dispersed solids of:
      (A) A water-insoluble polyepoxide preferably having on the average at least 2 epoxy groups in each molecule, a melting point above about 90° C., an average molecular weight above about 800 and an epoxide equivalent above about 200;
      (B) An aromatic urethane having the formula $Ar(NHCOX)_n$ wherein Ar is an organic residue containing at least one aromatic nucleus, X is a radical selected from the class consisting of aryloxy, arylthio, iminoxy, and lactam-N-yl, and $n$ is a whole number of at least 2, the weight ratio of $(A)/(B)$ being with the range from about 0.1 to about 10;
      (C) A resorcinol-formaldehyde resin in which the mol ratio of resorcinol to formaldehyde is between about 1.1 and 8; and
      (D) A synthetic vinylpyridine copolymer latex, the weight ratio of $(D)/(C)$ being within the range from 1 to 6, and the sum of (C) plus (D) constituting from about 50% to about 90% by weight of the total solids dispersed in the aqueous medium;
   (2) heating the coated structure at a temperature above 135° C. and below the melting point of the polyester structure to dry and at least partially cure the coating, and
   (3) applying and curing a layer of rubber on the coated structure.

2. A process as defined in claim 1 wherein the polyepoxide of (A) has a melting point between 90° and 150° C., an average molecular weight of 800 to 3000 and an epoxide equivalent between 200 and 2500.

3. A process as defined in claim 1 wherein the aqueous medium contains 1% to 9% by weight of the polyepoxide defined in (A).

4. A process as defined in claim 1 wherein the aqueous medium contains 1% to 9% by weight of the aromatic urethane defined in (B).

5. A process as defined in claim 1 wherein the resorcinol formaldehyde resin of (C) is free from added caustic and amines.

6. A process as defined in claim 1 wherein the aqueous medium contains 8% to 25% by weight of (C) plus (D).

7. A process as defined in claim 1 wherein said solids are dispersed in the aqueous medium with an alkylaryl polyether alcohol non-ionic dispersing agent.

8. A process as defined in claim 1 wherein said coating constitutes about 3% to 12% by weight of the coated structure and is heated at a temperature of 150° to 235° C. for about 0.3 to 15 minutes to dry and cure the coating.

9. A process as defined in claim 8 wherein a fibrous structure is coated and is maintained under sufficient tension to prevent shrinkage while heated to dry and cure the coating.

References Cited by the Examiner

UNITED STATES PATENTS

| | | | |
|---|---|---|---|
| 2,847,395 | 8/1958 | Wear | 117—161 |
| 2,872,428 | 2/1959 | Schroeder | 260—29.3 |
| 2,898,664 | 8/1959 | Salem | 117—7 |
| 2,902,398 | 9/1959 | Schroeder | 117—76 |
| 2,994,671 | 8/1961 | Thompson | 117—138.8 |

WILLIAM D. MARTIN, *Primary Examiner.*

RICHARD D. NEVIUS, *Examiner.*